United States Patent
Kim et al.

(10) Patent No.: US 9,800,940 B2
(45) Date of Patent: Oct. 24, 2017

(54) METHOD AND APPARATUS FOR AUTOMATIC SHARING AND CHANGE OF TV CHANNEL INFORMATION IN A SOCIAL NETWORKING SERVICE

(75) Inventors: Ji-Hyeok Kim, Incheon (KR); Kil-Su Eo, Yongin-si (KR); Joon-Oo Kim, Suwon-si (KR); Won-Sang Kwon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 247 days.

(21) Appl. No.: 13/437,763

(22) Filed: Apr. 2, 2012

(65) Prior Publication Data
US 2012/0254927 A1 Oct. 4, 2012

(30) Foreign Application Priority Data
Apr. 1, 2011 (KR) ........................ 10-2011-0030076

(51) Int. Cl.
*H04N 7/173* (2011.01)
*H04N 21/4788* (2011.01)
*H04N 21/414* (2011.01)
*H04N 21/438* (2011.01)
*H04N 21/482* (2011.01)
(Continued)

(52) U.S. Cl.
CPC ... *H04N 21/4788* (2013.01); *H04N 21/41407* (2013.01); *H04N 21/4383* (2013.01); *H04N 21/482* (2013.01); *H04N 21/84* (2013.01)

(58) Field of Classification Search
CPC .............. H04N 21/478; H04N 21/438; H04N 21/41407; H04N 21/632; H04N 21/6581; H04N 21/4622; H04N 21/2743; H04N 21/278; H04N 21/4335; H04N 21/45; H04N 21/458; H04N 21/47; H04N 21/47214; H04N 21/47217; H04N 21/4722; H04N 21/4725; H04N 21/478; H04N 21/4782; H04N 21/4788; H04N 21/485; H04N 21/2747; H04N 21/4355
USPC ................ 725/14, 50, 46, 58, 114; 715/758
See application file for complete search history.

(56) References Cited

U.S. PATENT DOCUMENTS

| 8,973,072 B2 * | 3/2015 | Julia .................. H04N 7/17318 725/109 |
| 2004/0049779 A1 * | 3/2004 | Sjoblom ................ H04H 20/18 725/13 |
| 2006/0205410 A1 * | 9/2006 | Black .......................... 455/445 |

(Continued)

FOREIGN PATENT DOCUMENTS

| JP | 2006-5896 | 1/2006 |
| JP | 2008-191768 | 8/2008 |

(Continued)

*Primary Examiner* — Pankaj Kumar
*Assistant Examiner* — Reuben M Brown

(57) ABSTRACT

According to certain embodiments, a method of sharing broadcasting channel information of a mobile device in a Social Networking Service (SNS) includes, if a user comment is posted for a broadcasting program, acquiring broadcasting program information from a Television (TV), uploading the broadcasting program information to a handover broker, acquiring access information that is configured to access the broadcasting program information from the handover broker, and uploading the access information and the user comment to an SNS server.

6 Claims, 9 Drawing Sheets

(51) Int. Cl.
*H04N 21/84* (2011.01)
*H04N 5/50* (2006.01)

(56) References Cited

U.S. PATENT DOCUMENTS

| | | | |
|---|---|---|---|
| 2006/0268895 A1* | 11/2006 | Kotzin | 370/395.64 |
| 2008/0077965 A1* | 3/2008 | Kamimaki | H04N 7/163 |
| | | | 725/105 |
| 2009/0019484 A1* | 1/2009 | Jo et al. | 725/40 |
| 2009/0150553 A1* | 6/2009 | Collart | G06F 17/30017 |
| | | | 709/229 |
| 2010/0023984 A1* | 1/2010 | Davi et al. | 725/110 |
| 2010/0191578 A1* | 7/2010 | Tran et al. | 705/10 |
| 2011/0078583 A1 | 3/2011 | Chunilal | |
| 2011/0208616 A1* | 8/2011 | Gorman et al. | 705/27.1 |
| 2011/0247039 A1* | 10/2011 | Cheng et al. | 725/52 |
| 2011/0276882 A1* | 11/2011 | Buehler et al. | 715/727 |
| 2012/0023392 A1* | 1/2012 | Cierniak | G06F 17/3089 |
| | | | 715/205 |
| 2012/0030587 A1* | 2/2012 | Ketkar | 715/751 |
| 2012/0030725 A1* | 2/2012 | Seno | H04N 5/44513 |
| | | | 725/113 |
| 2012/0047529 A1* | 2/2012 | Schultz et al. | 725/34 |
| 2012/0137329 A1* | 5/2012 | Patil | H04N 21/42216 |
| | | | 725/53 |
| 2012/0158455 A1* | 6/2012 | Pathak | G06Q 30/0201 |
| | | | 705/7.29 |
| 2012/0173383 A1* | 7/2012 | Badawiyeh et al. | 705/26.7 |
| 2012/0216226 A1* | 8/2012 | Humphrey | G06F 17/30026 |
| | | | 725/34 |
| 2012/0239763 A1* | 9/2012 | Musil | 709/206 |
| 2013/0218668 A1 | 8/2013 | Parekh et al. | |

FOREIGN PATENT DOCUMENTS

| | | |
|---|---|---|
| JP | 4625365 B2 | 2/2011 |
| JP | 2011508518 A | 3/2011 |
| KR | 20070100487 A | 10/2007 |

* cited by examiner

METHOD AND APPARATUS FOR AUTOMATIC SHARING AND CHANGE OF TV CHANNEL INFORMATION IN A SOCIAL NETWORKING SERVICE

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Apr. 1, 2011 and assigned Ser. No. 10-2011-0030076, the entire disclosure of which is hereby incorporated by reference.

TECHNICAL FIELD OF THE INVENTION

The present invention generally relates to computer networks, and more particularly, to a method and apparatus for automatic sharing and change of TV channel information in a social networking service.

BACKGROUND OF THE INVENTION

In general, media content is shared between two devices using a method which focuses on synchronization of a media playback environment via an instant messenger or the like and a method of selecting and receiving media content via remote server control. Recently, with the introduction of a Social Networking Service (SNS), when users record their comments together with a link of media content, other users can use the recorded information using a mobile device, a web browser, or other communication device.

Such a method can be useful when a device for receiving a link of media content is the same as a device for playing back the media content. If a user posts information associated with a broadcasting program, a problem may exist in that other users who desire to watch the same media content must turn on a Television (TV) and then directly change to a desired TV channel. In addition, when a means for exchanging comments and media content and a means for consuming them are separated may, in some cases, cause undue burden for the user.

SUMMARY OF THE INVENTION

To address the above-discussed deficiencies of the prior art, it is a primary aspect of the present invention is to provide a method and apparatus for automatically sharing and changing a Television (TV) channel using a Social Networking Service (SNS).

Another aspect of the present invention is to provide a method and apparatus for sharing media content by utilizing an SNS through interworking between devices in a situation where various media content consuming devices are present in an indoor environment, and for omitting an additional process of scanning media content by searching for a related possible consuming device to consume the media content.

In accordance with an aspect of the present invention, a method of sharing broadcasting channel information of a transmitting mobile device in an SNS includes, if a user comment is posted for a broadcasting program, acquiring broadcasting program information from a TV, uploading the broadcasting program information to a handover broker, acquiring access information configured to access the broadcasting program information from the handover broker, and uploading the access information and the user comment to an SNS server.

In accordance with another aspect of the present invention, a method of sharing broadcasting channel information of a receiving mobile device in an SNS includes, after accessing an SNS server, receiving a posted user comment and access information associated with broadcasting program information, receiving the broadcasting program information from a handover broker using the access information, and instructing a TV to change a current channel to a desired channel using the broadcasting program information.

In accordance with another aspect of the present invention, a method of sharing broadcasting channel information of a handover broker in an SNS includes, upon receiving an upload request of broadcasting program information from a particular mobile device, receiving the broadcasting program information from the particular mobile device, and transmitting access information that is configured to access the broadcasting program information to the particular mobile device.

In accordance with another aspect of the present invention, an apparatus configured to share broadcasting channel information of a transmitting mobile device in an SNS includes a first modem that is configured to communicate with a handover broker via a base station, a second modem configured to communicate with a TV, and a controller configured to, when a user comment is posted for a broadcasting program, acquire broadcasting program information from the TV, upload the broadcasting program information to the handover broker, acquire access information configured to access the broadcasting program information from the handover broker, and upload the access information and the user comment to an SNS server.

In accordance with another aspect of the present invention, an apparatus configured to share broadcasting channel information of a receiving mobile device in an SNS includes a first modem configured to communicate with a handover broker via a base station, a second modem configured to communicate with a TV, and a controller configured to, after accessing an SNS server, receive a posted user comment and access information, receive broadcasting program information from a handover broker using the access information, and instruct a TV to change a current channel to a desired channel by using the broadcasting program information.

In accordance with another aspect of the present invention, an apparatus configured to share broadcasting channel information of a handover broker in an SNS includes a modem configured to communicate with a mobile device, and a controller configured to, upon receiving an upload request of broadcasting program information from a particular mobile device, receive the broadcasting program information from the particular mobile device, and transmit access information that is configured to access the broadcasting program information to the particular mobile device.

In accordance with another aspect of the present invention, a system for sharing broadcasting channel information in an SNS includes a transmitting mobile device configured to, when a user comment is posted for a broadcasting program, acquire broadcasting program information from the TV, upload the broadcasting program information to the handover broker, acquire access information that is configured to access the broadcasting program information from the handover broker, and upload the access information and the user comment to an SNS server, a receiving mobile device configured to, after accessing an SNS server, receive a posted user comment and access information, receive broadcasting program information from a handover broker using the access information, and instruct a TV to change a current channel to a desired channel using the broadcasting program information, and the handover broker configured to, upon receiving an upload request of broadcasting program information from a particular mobile device, receive the broadcasting program information from the particular mobile device, and transmit access information that is configured to access the broadcasting program information to the particular mobile device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Certain embodiments of the present invention described hereinafter generally relates to a method and apparatus for decision making by considering a multi-user preference on a multi-user group.

Recently, the growing popularity of a Social Networking Service (SNS) provides a channel that allows a user to share experiences of consuming various media content.

Users share patterns of consuming their media content or comments on the media content via the SNS, and accordingly, there is a method of consuming media content through recommendation of friends based on the shared information.

The users can view media content via a web browser by using a Uniform Resource Location (URL) introduced in the SNS or the users can view the media content using an additional viewer program or other device. In this process, the users search for a device that plays back related media content, and searches media content using the device search process.

Certain embodiments of the present invention provides a method and apparatus for sharing broadcasting channel information which may be broadcasted on a real-time basis by using an SNS and for easily consuming the broadcasting channel information in a Television (TV). According to the present invention, users may share comments on broadcasting media content via the SNS by using mobile devices such that they may have an experience in which a broadcasting channel changes automatically by clicking information linked to the comments. Accordingly, the users can share and consume media content of another device in a more convenient manner.

Figure 1:
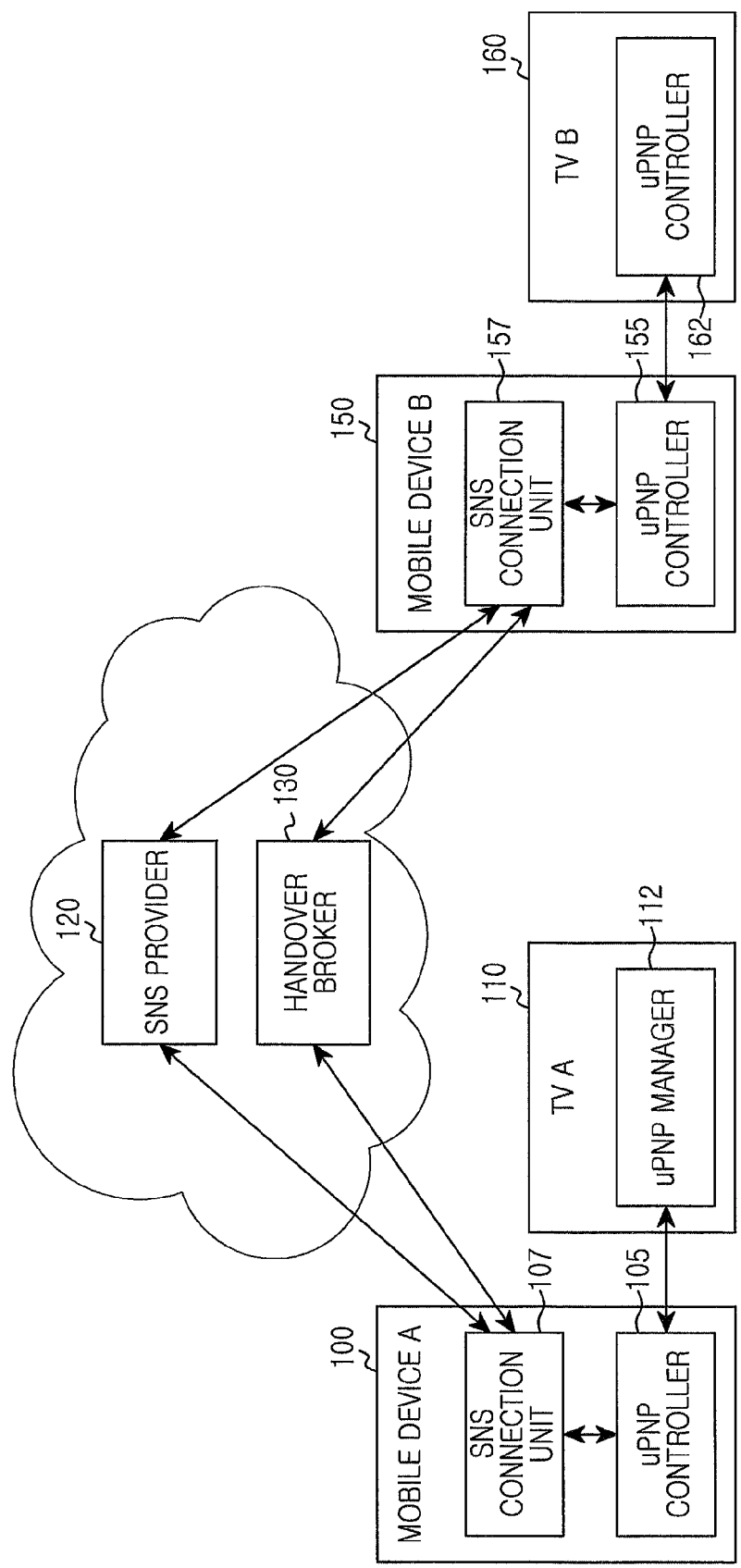
FIG. 1 illustrates an example structure of a system for a Social Networking Service (SNS) according to an embodiment of the present invention.

FIG. 1 illustrates an example structure of a system for an SNS according to an embodiment of the present invention.

Referring to FIG. 1, a user A has a mobile device A 100 and a TV A 110, and the two devices are communication with one another, such as via a WiFi router. That is, the two devices may be connected to the same network. Such a network connection configuration also applies to a case of a user B. User A and B can access the Internet by using a communication network or the WiFi router of the user's mobile device.

The mobile devices A 100 and B 150 respectively have SNS connection units 107 and 157 as an SNS access application or program. The users A and B can write and share comments by accessing the SNS via the SNS connection units 107 and 157.

The mobile devices A 100 and B 150 and the TVs A 110 and B 160 can exchange essential information by performing discovery and communication using a discovery technique, such as universal Plug and Play (UPnP). Functions thereof are performed by UPnP controllers 105 and 155 and UPnP managers 112 and 162.

The UPnP controllers 105 and 155 receive a broadcasting channel number, broadcasting information, a time, a region name, etc., via the UPnP managers 112 and 162 and provide the received information to the SNS connection units 107 and 157. Further, the UPnP controllers 105 and 155 can receive the channel number from the SNS connection units 107 and 157, and can change a currently watched channel via the UPnP managers 112 and 162. Configurations of the TV A 110 and the TV B 160 are illustrated in Table 1 below. A current channel number, a program title, a program schedule, a current broadcasting station, a current region, a current channel number, etc., are shown in Table 1 below.

TABLE 1

Device URN:
urn:samsung.com:device:TVInformation:1
Service:
    1. urn:samsung.com:service:Channel
        A. GetCurrentChannelNumber
        B. GetCurrentProgramTitle
        C. GetCurrentProgramSchedule
        D. GetCurrentBroadcastingStation
        E. GetRegion
        F. SetCurrentChannelNumber The SNS connection unit 107 provides a user interface for logging in, for writing a comment, and the like to a plurality of SNS providers 120 that exist on the Internet. Further, a URL link for uploading and downloading channel information acquired by interworking with a handover broker 130 is provided.

The SNS connection unit 107 attaches the provided URL to the SNS provider 120 when the user writes a comment. The user can write the user comment by using the SNS connection unit 107 and can post media content, a URL, and the like.

In one embodiment, a server referred to as the handover broker 130 is provided. The handover broker 130 can store and share broadcasting channel information in a XML format, and for this, an access point is provided as an http URL.

Although a WiFi router and UPnP are used for a connection between the mobile devices A 100 and B 150 and the TVs A 110 and B 160 in the example embodiment shown, other communication topologies such as Bluetooth, WiFi-Direct, Near Field Communication (NFC), and the like can also be used. The UPnP controllers 105 and 155 included in the mobile devices A 100 and B 150 can inter-work in an IPC manner or the like.

The SNS provider 120 refers to a general SNS that exists on the Internet.

The handover broker 130 generates a unique URL link on the basis of uploaded broadcasting channel information. Media content corresponding to the URL link can include a variety of information such as a channel number, a broadcasting name, a region name, a time, and the like.

A different user (e.g., the user B) can read media content posted on the SNS and can click the unique URL link included therein. In this case, a region name can be additionally inputted as a URL parameter. XML data acquired by the different user as a result of downloading the URL link is shown in Table 2 below. Regarding broadcasting information, a broadcasting station, a program title, a schedule, a channel number, a region, and the like can be included in Table 2 as shown below.

TABLE 2

Channel Info Format

<ChannelInfo>
    <BroadcastingStation>Movie9</BroadCastingStation>
    <ProgramTitle>My Family</ProgramTitle>
  <Schedule>2011/02/10/16:00~2011/02/10/18:00</Schedule>
  <ChannelNumber>34</ChannelNumber>
    <Region>Gyeonggi/Korea</Region>
</ChannelInfo>

Taking in consideration that a channel number may differ from one region to another, a mobile device of the different user, (i.e., the mobile device B 150), can report a correct channel by matching region information acquired using an access and download process.

According to such a process, other users belonging to the SNS can change a TV channel connected to their networks on the basis of channel information without users' intervention.

Figure 2:
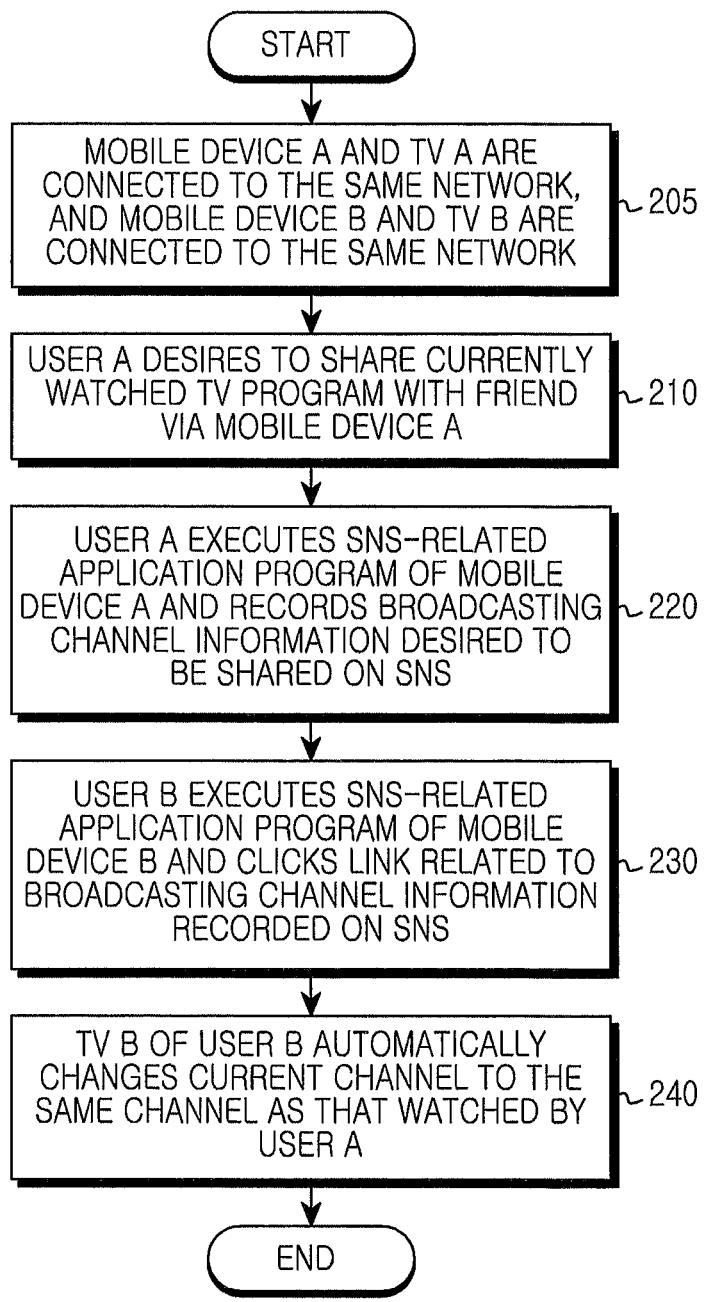
FIG. 2 illustrates an example operation for sharing a broadcasting program that may be consumed using an SNS according to an embodiment of the present invention.

FIG. 2 illustrates an example operation for sharing a broadcasting program watched by using an SNS according to an embodiment of the present invention.

Referring to FIG. 2, in step 205, a mobile device A and a TV A are connected to the same network, and a mobile device B and a TV B are also connected to the same network.

In step 210, a user A desires to share TV broadcasting currently watched by the user A with a friend via the mobile device A.

In step 220, the user A executes an SNS-related application program of the mobile device A, and records broadcasting channel information desired to be shared over the SNS.

In step 230, a user B executes an SNS-related application program of the mobile device B, and clicks a link related to broadcasting channel information recorded on the SNS.

In step 240, the mobile device B of the user B instructs or requests the TV B to change a current channel, and the TV B changes the current channel to the same channel as that watched by the user A without intervention of the user B. In FIG. 2, a TV channel is the same as a broadcasting channel.

Figure 3:
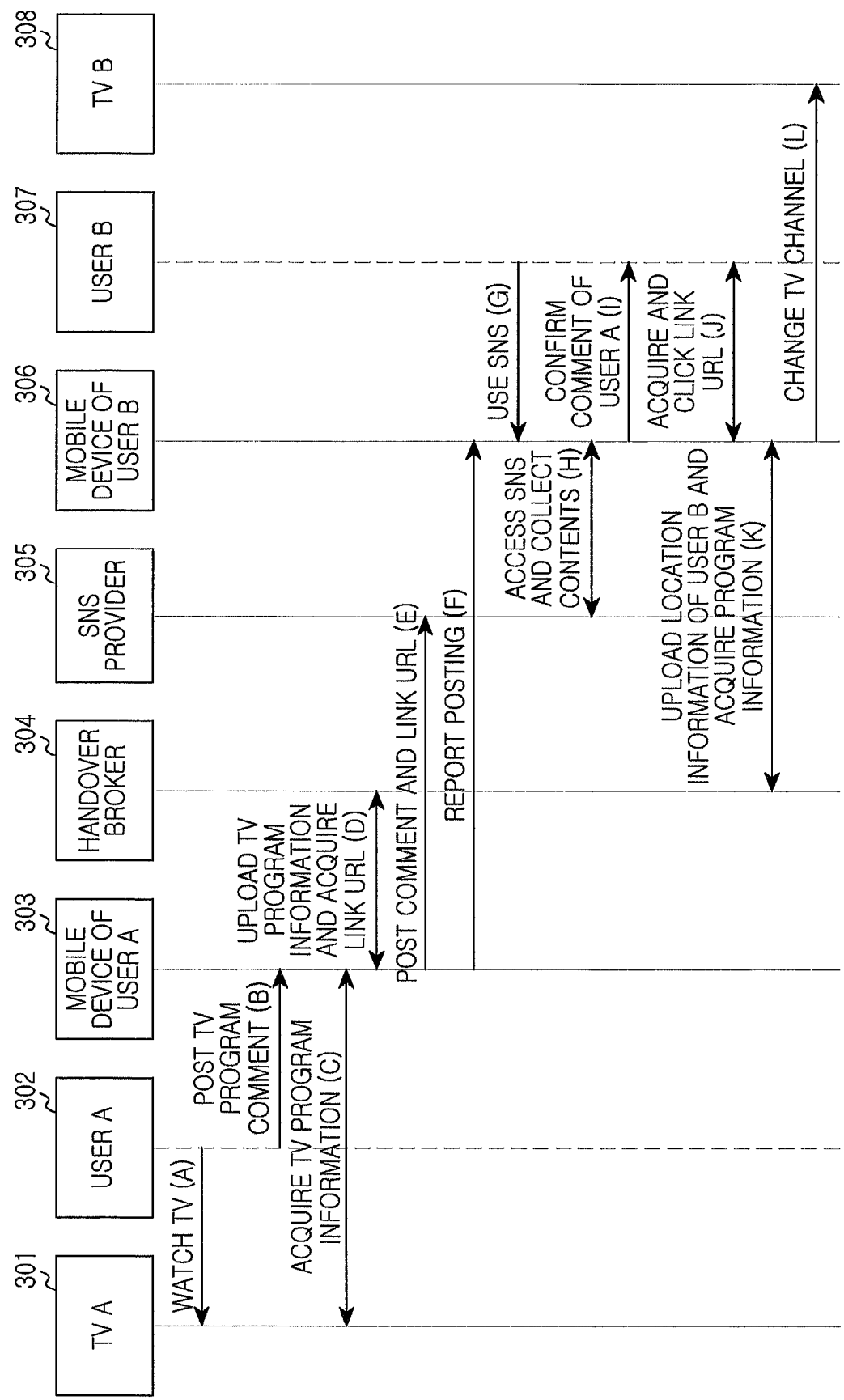
FIG. 3 illustrates an example message flow of an operation for sharing a broadcasting program consumed using an SNS according to an embodiment of the present invention.

FIG. 3 illustrates an example message flow of an operation for sharing a broadcasting program watched by using an SNS according to an embodiment of the present invention.

Referring to FIG. 3, while a user A 302 watches a TV A 301 in step A, if there is a broadcasting program desired to be watched together or to be shared, proceeding to step B, an instruction for posting channel information on the broadcasting program is inputted to a mobile device A 303 of the user A 302 to post the information to the SNS.

In step C, the mobile device A 303 of the user A 302 acquires information on the broadcasting program from the TV A 301. In step D, the mobile device A 303 uploads the information on the broadcasting program to a handover broker 304, and thereafter acquires a URL link that is configured to acquire the information on the broadcasting program.

In step 3, the mobile device A 303 of the user A 302 posts information including a user's comment on the broadcasting program and the acquired URL link to the SNS via an SNS provider 305. In this case, in order to additionally report to a different user (e.g., a user B 307) whether the posting is performed, in step F, the mobile device 303 of the user A 302 can transmit to a mobile device 306 of the different user (i.e., the user B) whether the posting is performed.

When the user B 307 uses the SNS in step G, the user B 307 accesses the SNS and acquires information and media content related to the user B in step H.

In this process, the user B 307 confirms the comment of the user A 302 via the mobile device 306 of the user B 307 in step I, and acquires the URL link in step J. In this case, the user B 307 can click the URL link to access the handover broker 304.

After accessing the handover broker 304 via the mobile device 306 of the user B 307, the user B 307 can acquire information on the broadcasting program in step K.

In step L, the mobile device 306 of the user B 307 changes a current channel to a channel of the broadcasting program.

The information on the broadcasting program can include the media content as shown in Table 1 and Table 2 above.

Figure 4:
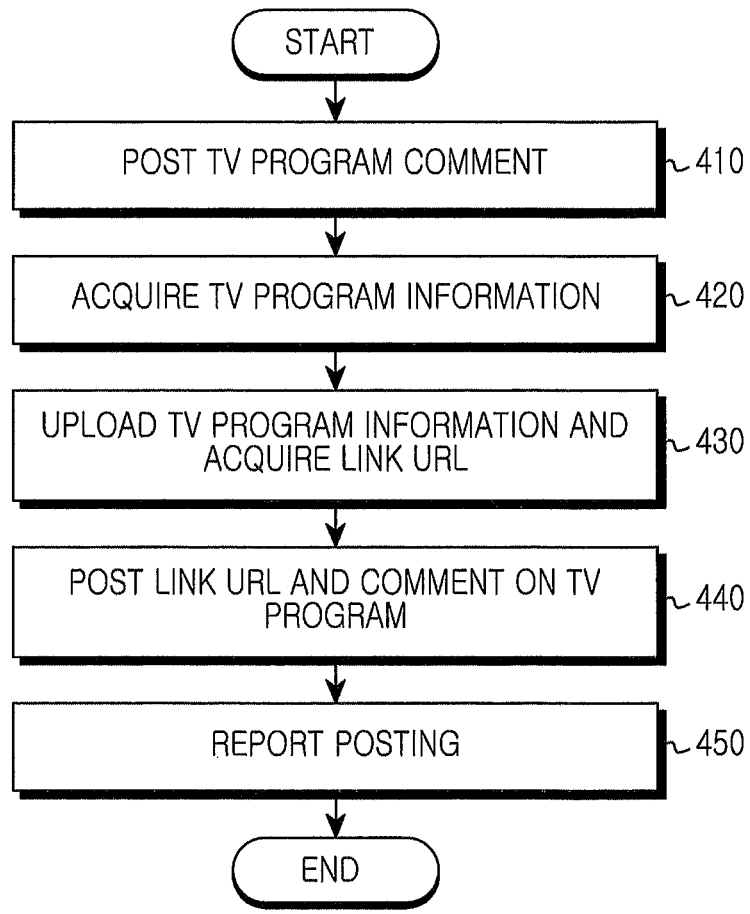
FIG. 4 illustrating an example operation of a mobile device according to an embodiment of the present invention.

FIG. 4 illustrates an example operation of a mobile device A according to an embodiment of the present invention.

Referring to FIG. 4, in step 410, a user A starts to post a broadcasting program desired to be watched together via the mobile device A.

In step 420, the mobile device A acquires information on the broadcasting program from a TV A. In step 430, the mobile device A uploads the acquired broadcasting program information to a handover broker and also acquires a URL link that is configured to acquire the information on the broadcasting program.

In step 440, the mobile device A posts the acquired URL link and a comment on the broadcasting program to an SNS.

In step 450, the mobile device A can report to other users whether posting has been performed.

Figure 5:
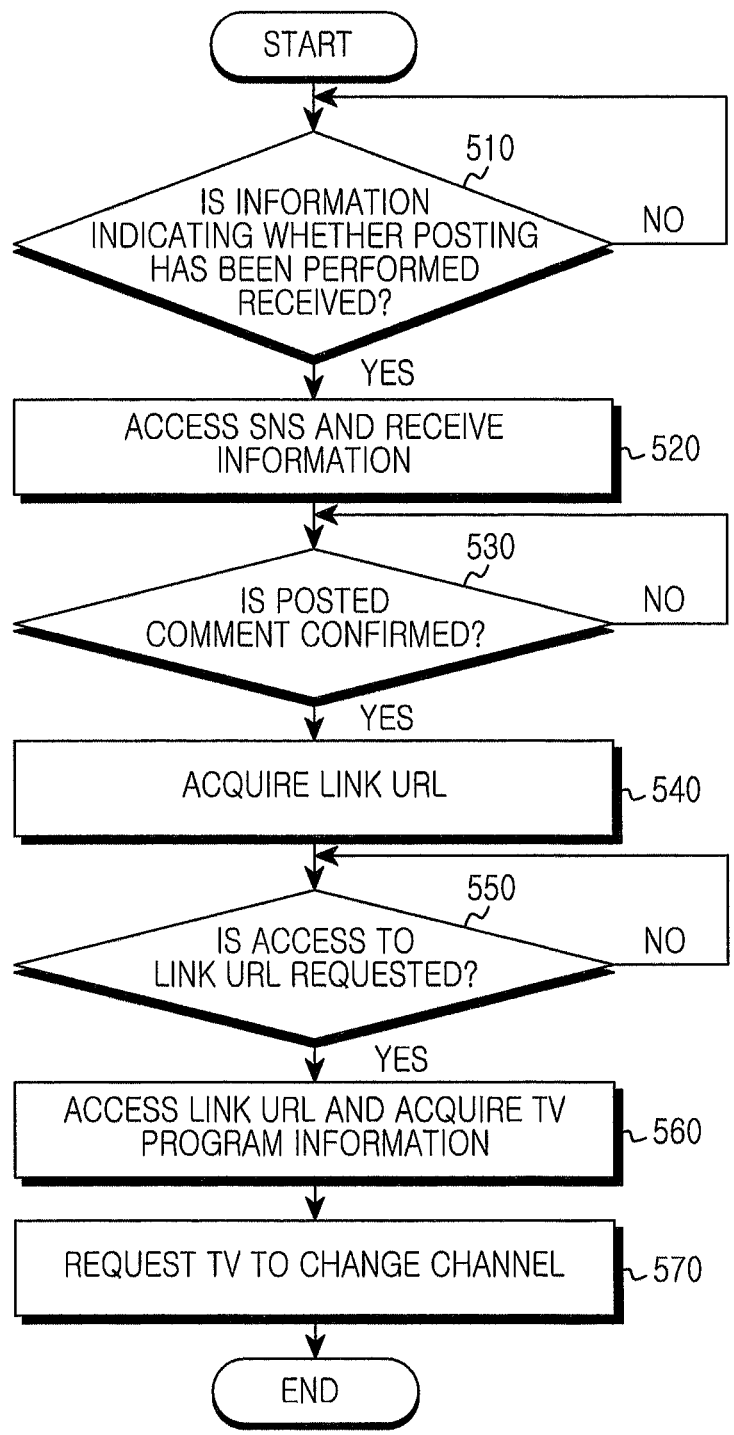
FIG. 5 illustrates an example operation of another mobile device according to an embodiment of the present invention.

FIG. 5 illustrates an example operation of a mobile device B according to an embodiment of the present invention.

Referring to FIG. 5, when receiving information indicating whether posting is performed via the mobile device B in step 510, a user B accesses an SNS access and receives posted information (i.e., comment) in step 520. Further, an SNS server can report that posting to the mobile device B has been performed.

When confirming the posted media content (i.e., comment) in step 530, the user B also acquires a server's URL link including information on a broadcasting program included in the posted media content in step 540.

When the user B clicks the URL link via the mobile device B and thus requests an access to the URL in step 550, the mobile device B accesses the server corresponding to the URL link and acquires information on the broadcasting program from the server in step 560.

Then, the mobile device B requests and instructs a TV B to change a current channel to a desired channel, and when the TV B changes the current channel to the desired channel, the user B can watch a channel posted by a user A in step 570.

Figure 6:
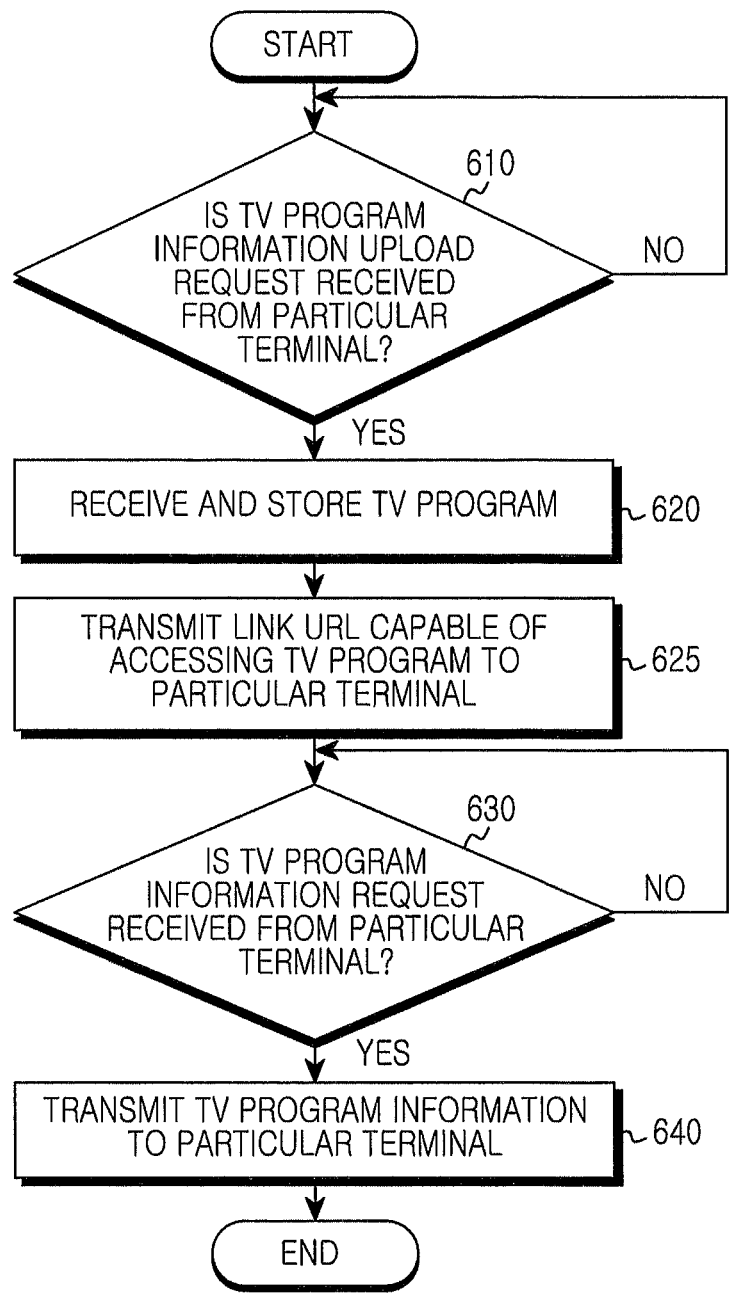
FIG. 6 illustrates an example operation of a handover broker according to an embodiment of the present invention.

FIG. 6 illustrates an example operation of a handover broker according to an embodiment of the present invention.

Referring to FIG. 6, upon receiving a broadcasting program information upload request from a particular terminal (i.e., a mobile device A) in step 610, the handover broker receives and stores the broadcasting program information in step 620, and transmits a URL link capable of accessing that is configured to access the broadcasting program information to the particular terminal (i.e., the mobile device A) in step 625.

Upon receiving a broadcasting program information request from a particular terminal (i.e., a mobile device B) in step 630, the handover broker transmits the broadcasting program information to the particular terminal (i.e., the mobile device B) in step 640.

Figure 7:
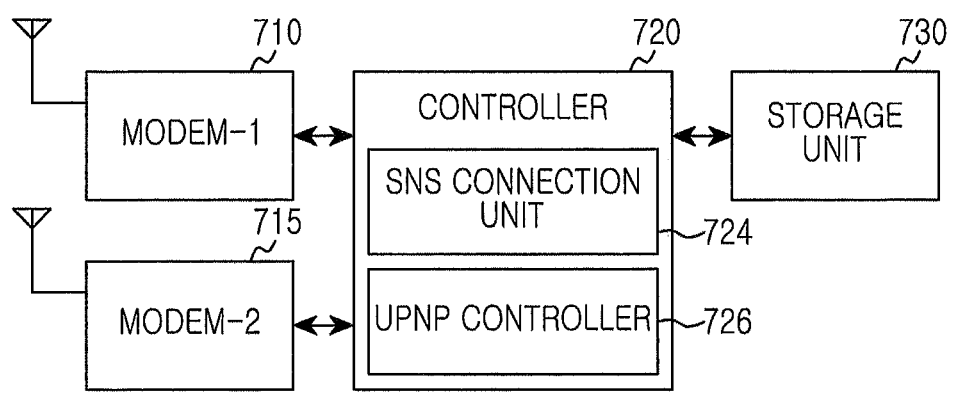
FIG. 7 illustrates an example structure of a mobile device according to an embodiment of the present invention.

FIG. 7 illustrates an example structure of a mobile device according to an embodiment of the present invention.

Referring to FIG. 7, the mobile device may be the aforementioned mobile device A or B. The mobile device includes a modem-1 710, a modem-2 715, a controller 720, and a storage unit 730. The controller 720 includes an SNS connection unit 724 and a UPnP controller 726.

The modem-1 710 and the modem-2 715 communicate with other devices, and include a wireless processor and a baseband processor. The wireless processor converts signals received through an antenna into baseband signals and provides the converted signals to the baseband processor. Further, the wireless processor converts baseband signals received from the baseband processor so that the baseband signals can be converted and transmitted through the antenna. Any suitable wireless communication technique may be used by the modem-1 710 and the modem-2 715.

For convenience of explanation, it is assumed in the present invention that the modem-1 710 is used for mobile communication, and the modem-2 715 is used for communication with a TV.

The controller 720 controls the mobile device. In particular, according to the present invention, the controller 720 controls the SNS connection unit 724 and the UPnP controller 726.

The storage unit 730 stores a program for controlling operation of the mobile device and stores temporary data which is generated while performing the program.

In particular, the storage unit 730 stores a URL link and information on a broadcasting program according to the embodiment of the present invention.

Now, a transmitting mobile device, such as the aforementioned mobile device A shown above will be described.

By using the modem-2 715, the UPnP controller 726 acquires a broadcast program currently watched by the user A using a TV A or broadcasting program information which is not currently watched but which is stored in the TV A.

When the user A starts to post a broadcasting program to be watched together, the SNS connection unit 724 acquires the broadcasting program information acquired from the UPnP controller 726, uploads the acquired broadcasting information to the handover broker, and acquires a URL link that is configured to acquire the broadcasting program information.

Then, the SNS connection unit 724 posts to the SNS the acquired URL link and broadcasting program comment to be posted. In this case, the SNS connection unit 724 can report to a different user (e.g., a user B) whether the posting has been performed.

Now, another transmitting mobile device, that is, the aforementioned mobile device B, will be described. Upon receiving via the mobile device B whether posting has been performed, the user B accesses an SNS and receives posted information. Alternatively, an SNS server can report to the mobile device B that the posting has been performed.

Then, when the user B confirms posted media content (i.e., comment) via the SNS connection unit 724, the SNS connection unit 724 also acquires a URL link and a URL of a server including information on a broadcasting program included in the posted media content.

Then, when the user B clicks the URL link to request an access to the URL, the SNS connection unit 724 accesses the server corresponding to the URL link, and acquires information on the broadcasting program from the server.

Then, the SNS connection unit 724 requests the TV B to change a current channel to a desired channel via the UPnP controller 726. When the TV B changes the current channel to the desired channel, the user B can watch the channel posted by the user A.

Figure 8:
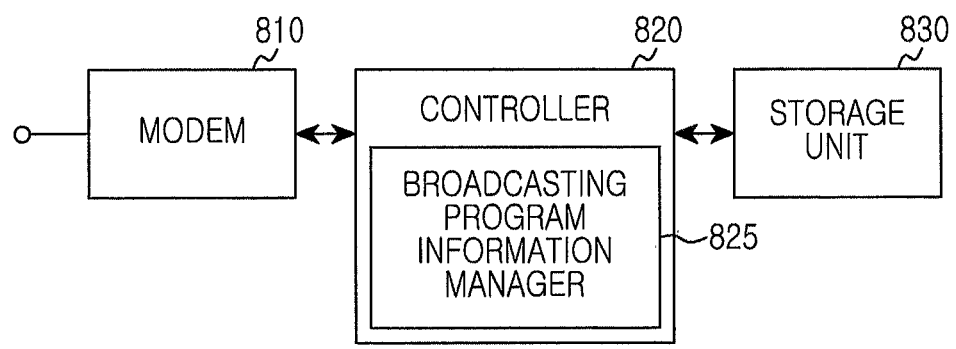
FIG. 8 illustrates an example structure of a handover broker according to an embodiment of the present invention.

FIG. 8 illustrates an example structure of a handover broker according to an embodiment of the present invention.

Referring to FIG. 8, the handover broker includes a modem 810, a controller 820, and a storage unit 830. The controller 820 includes a broadcasting program information manager 825.

The modem 810 communicates with other devices, and includes a wired processor and a baseband processor. The wired processor converts signals received through a wired path into baseband signals and provides the converted signals to the baseband processor. Further, the wired processor converts baseband signals received from the baseband processor into wired signals and transmits the converted signal through the wired path.

The controller 820 controls operation of the handover broker. In particular, according to the present invention, the controller 820 controls the broadcast program information manager 825.

The storage unit 830 stores a program for controlling operation of the handover broker and stores temporary data which is generated while performing the program. In particular, the storage unit 830 stores information on a broadcasting program according to the embodiment of the present invention.

Upon receiving a broadcasting program information upload request from a particular terminal (i.e., a mobile device A), the broadcasting program information manager 825 receives the broadcasting program information and stores the received information in the storage unit 830.

Then, the broadcasting program information manager 825 transmits a URL link that is configured to access the broadcasting program information to the particular terminal.

Upon receiving a broadcasting program information request from a particular terminal (i.e., a mobile device B), the broadcasting program information manager 825 transmits broadcasting program information to the particular terminal (i.e., the mobile device B).

Figure 9:
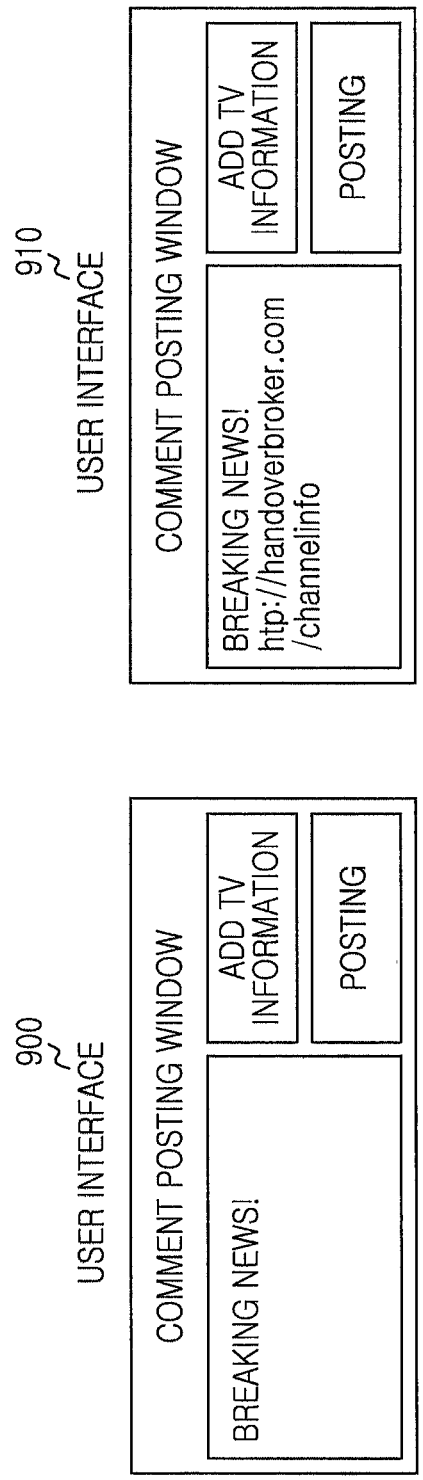
FIG. 9 illustrates an example user interface of a mobile device when posting broadcasting program information according to an embodiment of the present invention.

FIG. 9 illustrates an example user interface of a mobile device when posting broadcasting program information according to an embodiment of the present invention.

Referring to FIG. 9, a user can use a user interface 900 when writing a comment to be posted on an SNS.

In case of a comment posting window shown in the user interface 900, when the user inputs desired broadcasting program information and clicks a button for adding TV information, the SNS connection unit 724 of the mobile device uploads the broadcasting program information which is inputted by the user to the handover broker, and the handover broker provides the SNS connection unit 724 with a unique URL link capable of accessing the broadcasting program information. For example, the broadcasting program information may include any type, such as "breaking news!".

Then, the SNS connection unit 724 displays the unique URL link as shown in a user interface 910. For example, the unique URL link may be "Http://handoverbroker.com/channelinfo".

When the user clicks a posting button in the user interface 910, the SNS connection unit 724 uploads the broadcasting program information which is inputted by the user and the unique URL link to the SNS server.

In the present invention, the user shares a comment on broadcasting media content via the SNS by using mobile devices and allows a TV channel to be automatically changed by clicking a URL link that is linked to the comment. Therefore, the user can share and consume media content in a more convenient manner.

According to certain embodiments of the present invention, a user can omit a process of scanning media content and searching for a device that plays back the media content by the use of a URL link of the media content posted in an SNS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of sharing broadcasting channel information in a mobile device through a Social Networking Service (SNS), the method comprising:
    establishing, at the mobile device, a local network communication with a display device displaying a first program, wherein the first program is received through a channel and is displayed on the display device;
    receiving, at the mobile device, a user input including a first comment regarding the first program displayed on the display device;
    obtaining, at the mobile device, first broadcasting program information through the local network communication with display device, from the display device;
    transmitting the first broadcasting program information to a server;
    receiving a first Uniform Resource Location (URL) that is configured to allow an access to the first program from the server;
    uploading, at the mobile device, the first comment regarding the first program and the first URL to an SNS server;
    in response to selecting an SNS posting including a second comment regarding a second program and a second URL that allows an access to the second program, obtaining the second URL from the SNS server;
    transmitting the second URL to the server;
    receiving second broadcasting program information corresponding to the second URL from the server; and
    transmitting the second broadcasting program information to the display device via the local network communication.

2. The method of claim 1, wherein uploading the user input and the URL comprises:
    uploading the user input regarding the program and access information including the URL, to the SNS server,
    wherein the access information further includes at least one of a broadcasting station information, a program title, a schedule, a channel number, and a region.

3. The method of claim 1, wherein the second broadcasting program information includes at least one of a broadcasting station information, a program title, a schedule, a channel number, and a region.

4. An apparatus configured to share broadcasting channel information through an SNS, the apparatus comprising:
    a communication interface; and
    a controller configured to:
        establish, at a mobile device, a local network communication with a display device displaying a first program, wherein the first program is received through a channel and is displayed on the display device;
        receive a user input including a first comment regarding the first program displayed on the display device;
        obtain first broadcasting program information through the local network communication with display device, from the display device;
        control the communication interface to transmit the first broadcasting program information to a server;
        receive a first Uniform Resource Location (URL) that is configured to allow an access to the first program from the server through the communication interface;
        control the communication interface to upload the first comment regarding the first program and the first program and the URL to an SNS server;

in response to selecting an SNS posting including a second comment regarding a second program and a second URL that allows an access to the second program, obtain the second URL from the SNS server;

control the communication interface to transmit the second URL to the server;

receive second broadcasting program information corresponding to the second URL from the server; and control the communication interface to transmit the second broadcasting program information to the display device via the local network communication.

5. The apparatus of claim 4, wherein the communication interface is configured to upload the user input regarding the program and access information including the URL, to the SNS server, wherein access information further includes at least one of a broadcasting station information, a program title, a schedule, a channel number, or a region.

6. The apparatus of claim 4, wherein the second broadcasting program information includes at least one of a broadcasting station information, a program title, a schedule, a channel number, and a region.

\* \* \* \* \*